United States Patent
Chang

(10) Patent No.: US 8,781,237 B2
(45) Date of Patent: Jul. 15, 2014

(54) 3D IMAGE PROCESSING METHODS AND SYSTEMS THAT DECOMPOSE 3D IMAGE INTO LEFT AND RIGHT IMAGES AND ADD INFORMATION THERETO

(75) Inventor: Chia Liang Chang, Taichung (TW)

(73) Assignees: Sintai Optical (Shenzhen) Co., Ltd., Shenzhen, Guangdong Province (CN); Asia Optical Co. Inc., Taichung (TW)

( * ) Notice: Subject to any disclaimer, the term of this patent is extended or adjusted under 35 U.S.C. 154(b) by 130 days.

(21) Appl. No.: 13/584,900

(22) Filed: Aug. 14, 2012

(65) Prior Publication Data
US 2014/0050412 A1 Feb. 20, 2014

(51) Int. Cl.
G06K 9/36 (2006.01)
G06K 9/46 (2006.01)

(52) U.S. Cl.
USPC .......................................... 382/233

(58) Field of Classification Search
None
See application file for complete search history.

(56) References Cited

U.S. PATENT DOCUMENTS

| | | | | |
|---|---|---|---|---|
| 6,253,031 B1 * | 6/2001 | Inaba | 396/326 |
| 6,351,553 B1 * | 2/2002 | Hayosh | 382/139 |
| 2002/0030888 A1 * | 3/2002 | Kleinberger et al. | 359/465 |
| 2007/0002132 A1 * | 1/2007 | Kim et al. | 348/57 |
| 2007/0247709 A1 * | 10/2007 | Karakawa | 359/464 |
| 2010/0257188 A1 * | 10/2010 | Kim et al. | 707/756 |
| 2011/0037829 A1 * | 2/2011 | Hata | 348/43 |
| 2011/0084974 A1 * | 4/2011 | Jung et al. | 345/522 |
| 2011/0115887 A1 * | 5/2011 | Yoo et al. | 348/51 |
| 2011/0126160 A1 * | 5/2011 | Han et al. | 715/848 |
| 2011/0134215 A1 * | 6/2011 | Kim | 348/43 |
| 2011/0149054 A1 * | 6/2011 | Yun et al. | 348/58 |
| 2011/0157325 A1 * | 6/2011 | Tanaka | 348/51 |
| 2011/0175903 A1 * | 7/2011 | Munro et al. | 345/419 |
| 2011/0187822 A1 * | 8/2011 | Yoo | 348/43 |
| 2011/0285706 A1 * | 11/2011 | Daigi | 345/419 |
| 2012/0026299 A1 * | 2/2012 | Arai | 348/49 |
| 2012/0050271 A1 * | 3/2012 | Ra et al. | 345/419 |
| 2012/0069147 A1 * | 3/2012 | Todoroki | 348/43 |
| 2012/0076399 A1 * | 3/2012 | Yamaji et al. | 382/154 |
| 2012/0081364 A1 * | 4/2012 | Yamaji et al. | 345/419 |
| 2012/0098944 A1 * | 4/2012 | Oh | 348/54 |
| 2012/0127285 A1 * | 5/2012 | Ishidoshiro | 348/54 |
| 2012/0249529 A1 * | 10/2012 | Matsumoto et al. | 345/419 |
| 2012/0320036 A1 * | 12/2012 | Kang | 345/419 |
| 2013/0016196 A1 * | 1/2013 | Kim et al. | 348/54 |

* cited by examiner

*Primary Examiner* — Bhavesh Mehta
*Assistant Examiner* — Feng Niu

(57) ABSTRACT

3D image processing methods and systems for use in an electronic device having an image decoding unit are provided. The image decoding unit includes a sequence of decoding sub-units. First, a first decoding sub-unit receives at least one 3D image. A second decoding sub-unit decomposes the 3D image into a left image or a right image according to a 3D format corresponding to the 3D image. Then, a third decoding sub-unit performs a management/control operation according to the left image or the right image, wherein the third decoding sub-unit is in the rear of the second decoding sub-unit in the sequence. In some embodiment, the second decoding sub-unit can put a tag of image type or information of image processing into a specific position of data corresponding to the left image or the right image, for subsequent decoding sub-units to process the image.

18 Claims, 5 Drawing Sheets

3D IMAGE PROCESSING METHODS AND SYSTEMS THAT DECOMPOSE 3D IMAGE INTO LEFT AND RIGHT IMAGES AND ADD INFORMATION THERETO

BACKGROUND OF THE INVENTION

1. Field of the Invention

The disclosure relates generally to 3D image processing methods and systems, and more particularly, to methods and systems that first decompose a 3D image into left/right images, and/or add related information to a specific position in data of the left/right images, and then perform related control operations according to the left/right images.

2. Description of the Related Art

Recently, with the development of 3D image technology, electronic devices such as TVs, projectors, and displayers further provide percipience of 3D space in addition to general images and colors, thus providing more real and vivid visual experiences to users. In the meantime, with the vigorous development of 3D display technology, the applications for 3D image display are become more and more diversification.

Generally, an image decoding process is accomplished via an image decoding unit including a sequence of decoding sub-units. For some image playback devices, such as TVs or projectors, each level of the decoding sub-units in the image decoding unit is responsible for respective image process. For example, the image process may be the display of user operational interface, color process, dynamic image process, keystone correction, or others. In most devices, the front-end decoding sub-units in the image decoding unit mainly perform the functions of display of user operational interface, color process, dynamic image process, and keystone correction. Conventionally, the final decoding sub-units in the image decoding unit will decompose a 3D image into left/right images. Since the sequence of the left/right images is known, a control signal corresponding to a 3D glass can be generated, such that uses wearing the 3D glass can have the 3D percipience corresponding to the 3D image.

However, if a front-end decoding sub-unit performs the above functions, such as the keystone correction to an 3D image without decomposition, and a rear-end decoding sub-unit then decomposes the 3D image into left/right images, in some cases, the user interface may be disappeared or unwillingly cropped, or the image may be deformed. For example, FIG. 1A illustrates a 3D image 100 including a left image L and a right image R. The front-end decoding sub-unit performs the keystone correction to the 3D image 100 in FIG. 1A, and the corrected 3D image 110 is displayed in FIG. 1B. At the time, if the rear-end decoding sub-unit decomposes the corrected 3D image 110, and overlaps the left/right images, distortion situation will be occurred, as the overlap image 200 shown in FIG. 2. In order to see normal 3D images, some functions must be cancelled or performed by the final decoding sub-unit in these devices, thus affecting the global efficiency of 3D decoding.

BRIEF SUMMARY OF THE INVENTION 3D image processing methods and systems are provided. An 3D image can be first decomposed into left/right images, and/or related information can be added to a specific position in data of the left/right images, and then related control operations can be performed according to the left/right images, thus to avoid distortions and mistakes due to image processing, and improve the efficiency of related control operations.

In an embodiment of a 3D image processing method for use in an electronic device having an image decoding unit with a sequence of decoding sub-units, a first decoding sub-unit receives at least one 3D image. A second decoding sub-unit decomposes the 3D image into a left image or a right image according to a 3D format corresponding to the 3D image. Then, a third decoding sub-unit performs a control operation according to the left image or the right image, wherein the third decoding sub-unit is in the rear of the second decoding sub-unit in the sequence.

An embodiment of a 3D image processing system for use in an electronic device comprises an image decoding unit having a sequence of a plurality of decoding sub-units. The image decoding unit comprises at least a first decoding sub-unit, a second decoding sub-unit, and a third decoding sub-unit. The first decoding sub-unit receives at least one 3D image. The second decoding sub-unit decomposes the 3D image into a left image or a right image according to a 3D format corresponding to the 3D image. The third decoding sub-unit performs a control operation according to the left image or the right image, wherein the third decoding sub-unit is in the rear of the second decoding sub-unit in the sequence.

In some embodiment, the second decoding sub-unit can put a tag of image type, such as a left image tag and a right image tag into a specific position of data corresponding to the left image or the right image.

In some embodiment, the third decoding sub-unit can obtain the tag of image type from the specific position of the data corresponding to the left image or the right image, and perform the control operation according to the tag of image type. In some embodiments, the control operation can comprise a 3D glass control operation.

In some embodiment, the second decoding sub-unit can put some information of image processing into a specific position of data corresponding to the left image or the right image. The third decoding sub-unit can obtain the information of image processing from the specific position of the data corresponding to the left image or the right image, and perform the control operation according to the information of image processing. In some embodiments, the control operation can comprise a performance of an image process to the left image or the right image according to the information of image processing.

In some embodiments, the third decoding sub-unit is immediately or indirectly in the rear of the second decoding sub-unit in the sequence. In some embodiments, the first decoding sub-unit and the second decoding sub-unit are the same decoding sub-unit.

In some embodiments, the specific position may be a front porch or a back porch of signal corresponding to the left image or the right image.

In an embodiment of a 3D image processing method for use in an electronic device having an image decoding unit, at least one 3D image is received. The 3D image is decomposed into a left image or a right image according to a 3D format corresponding to the 3D image. Then, a tag of image type is put into a specific position of data corresponding to the left image or the right image, wherein the tag of image type comprises a tag of left image and a tag of right image.

An embodiment of a 3D image processing system for use in an electronic device comprises at least an image decoding unit. The image decoding unit receives at least one 3D image, and decomposes the 3D image into a left image or a right image according to a 3D format corresponding to the 3D image. Then, the image decoding unit put a tag of image type into a specific position of data corresponding to the left image or the right image, wherein the tag of image type comprises a tag of left image and a tag of right image.

In some embodiment, some information of image processing can be also put into the specific position of the data corresponding to the left image or the right image.

In some embodiments, the specific position may be a front porch or a back porch of signal corresponding to the left image or the right image.

3D image processing methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION 3D image processing methods and systems are provided.

Figure 1A:
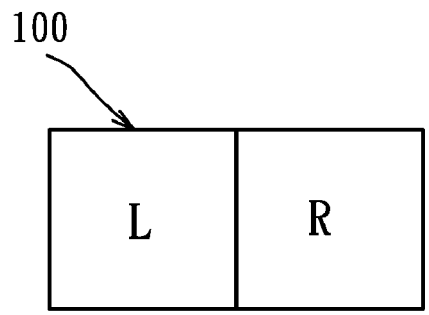
FIG. 1A illustrates a 3D image including a left image and a right image.
Figure 1B:
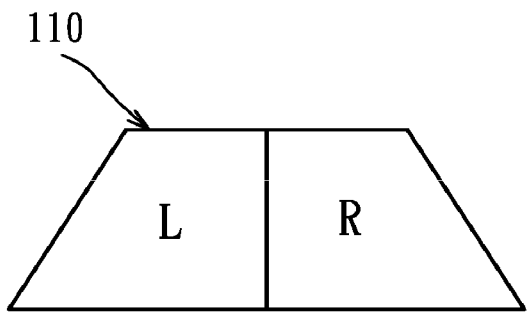
FIG. 1B illustrates the 3D image in FIG. 1A after keystone correction.
Figure 2:
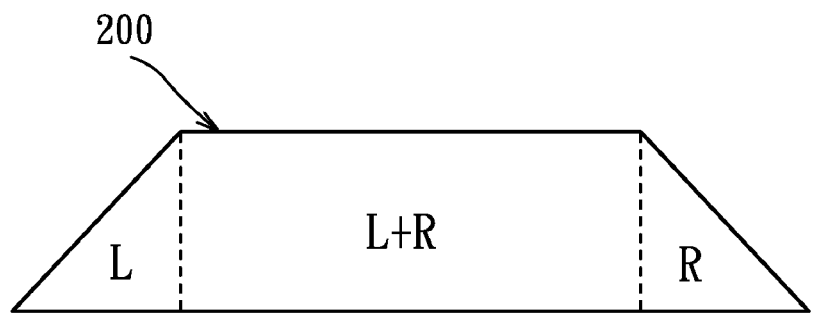
FIG. 2 illustrates a 3D overlap image corresponding to the decomposed 3D image in FIG. 1B
Figure 3:
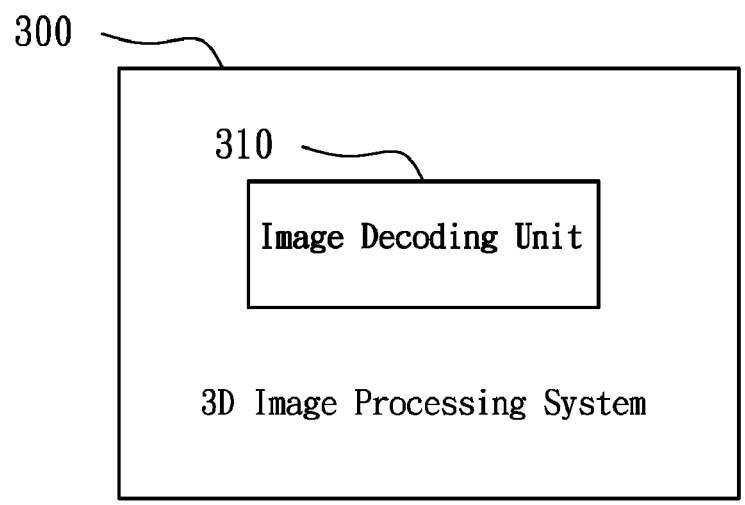
FIG. 3 is a schematic diagram of an embodiment of a 3D image processing system of the invention.
Figure 4:
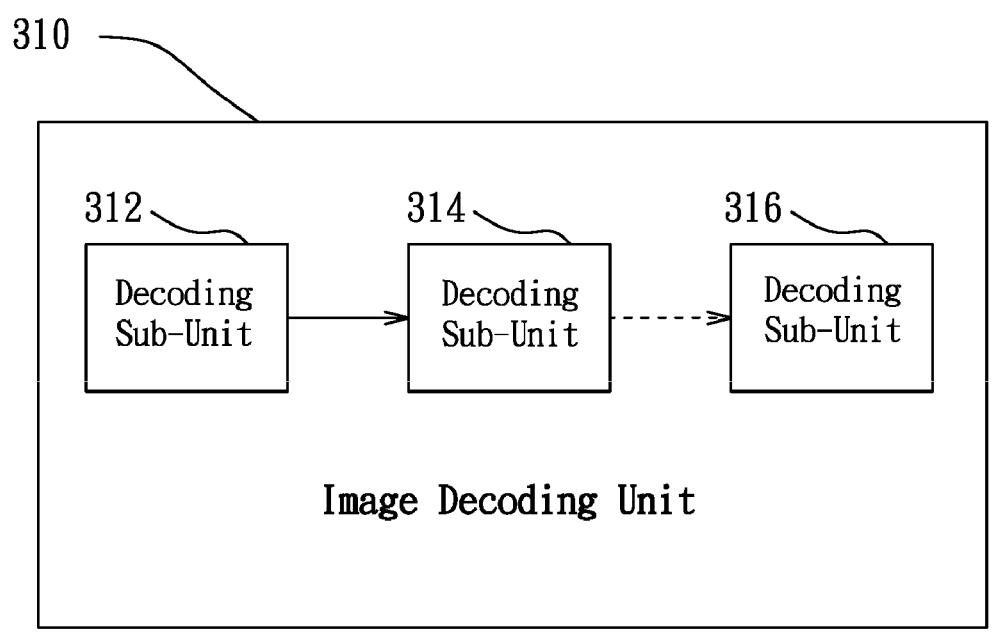
FIG. 4 is a schematic diagram of an embodiment of an image decoding unit of the invention.

FIG. 3 is a schematic diagram of an embodiment of a 3D image processing system of the invention. The 3D image processing system 300 can be used in an electronic device, such as TVs, projectors, game devices, displayers, and any processor-based device having image processing capability. The 3D image processing system 300 comprises at least an image decoding unit 310. In the present application, the image decoding unit 310 can comprise a sequence of decoding sub-units (312, 314, 316), as shown in FIG. 4. Each decoding sub-unit can perform related image processes and/or related control operations to the image output by the preceding decoding sub-unit. The image decoding unit 310 can perform the 3D image processing method of the preset invention, which will be discussed later.

Figure 5:
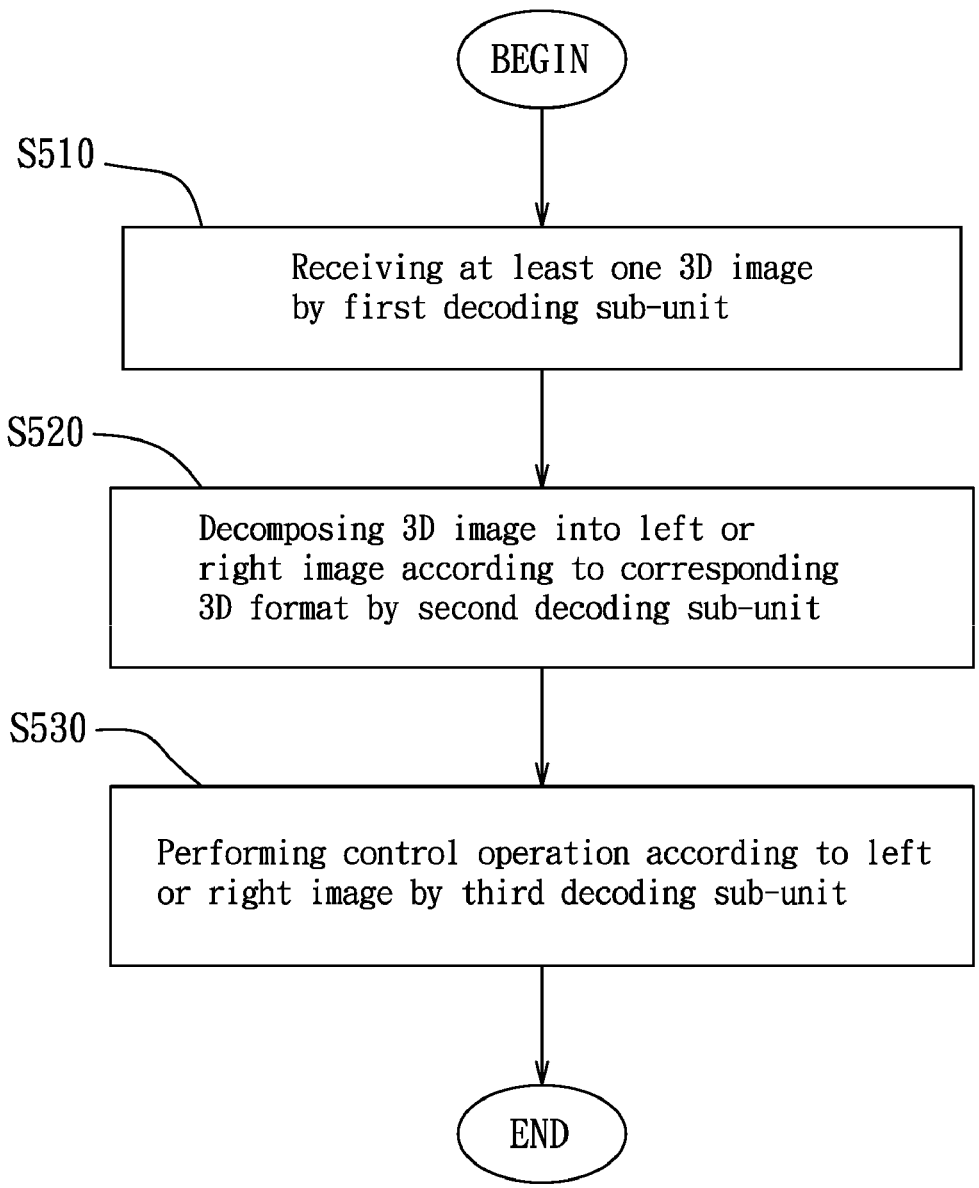
FIG. 5 is a flowchart of an embodiment of a 3D image processing method of the invention.

FIG. 5 is a flowchart of an embodiment of a 3D image processing method of the invention. The 3D image processing method can be used in an electronic device, such as TVs, projectors, game devices, displayers, and any processor-based device having image processing capability. In this embodiment, a 3D image can be decomposed into left/right images, and then related control operations are performed according to the left/right images.

In step S510, a first decoding sub-unit in the image decoding unit receives at least one 3D image. It is noted that, in some embodiments, the first decoding sub-unit in step S510 may be the first decoding sub-unit in the sequence of decoding sub-units in the image decoding unit. Then, in step S520, a second decoding sub-unit in the image decoding unit decomposes the 3D image into a left image or a right image according to a 3D format corresponding to the 3D image. It is understood that, in some embodiments, the first decoding sub-unit and the second decoding sub-unit may be the same decoding sub-unit. In step S530, a third decoding sub-unit performs a control operation according to the left image or the right image. It is understood that, in the sequence of decoding sub-units in the image decoding unit, the third decoding sub-unit is in the rear of the second decoding sub-unit. Note that, the third decoding sub-unit may be immediately or indirectly in the rear of the second decoding sub-unit. Additionally, in some embodiments, the above control may comprise display of user operational interface, color process, dynamic image process, and/or keystone correction for the left image or the right image. In some embodiments, the control operation can be a 3D glass control operation according to the left image or the right image.

Figure 6:
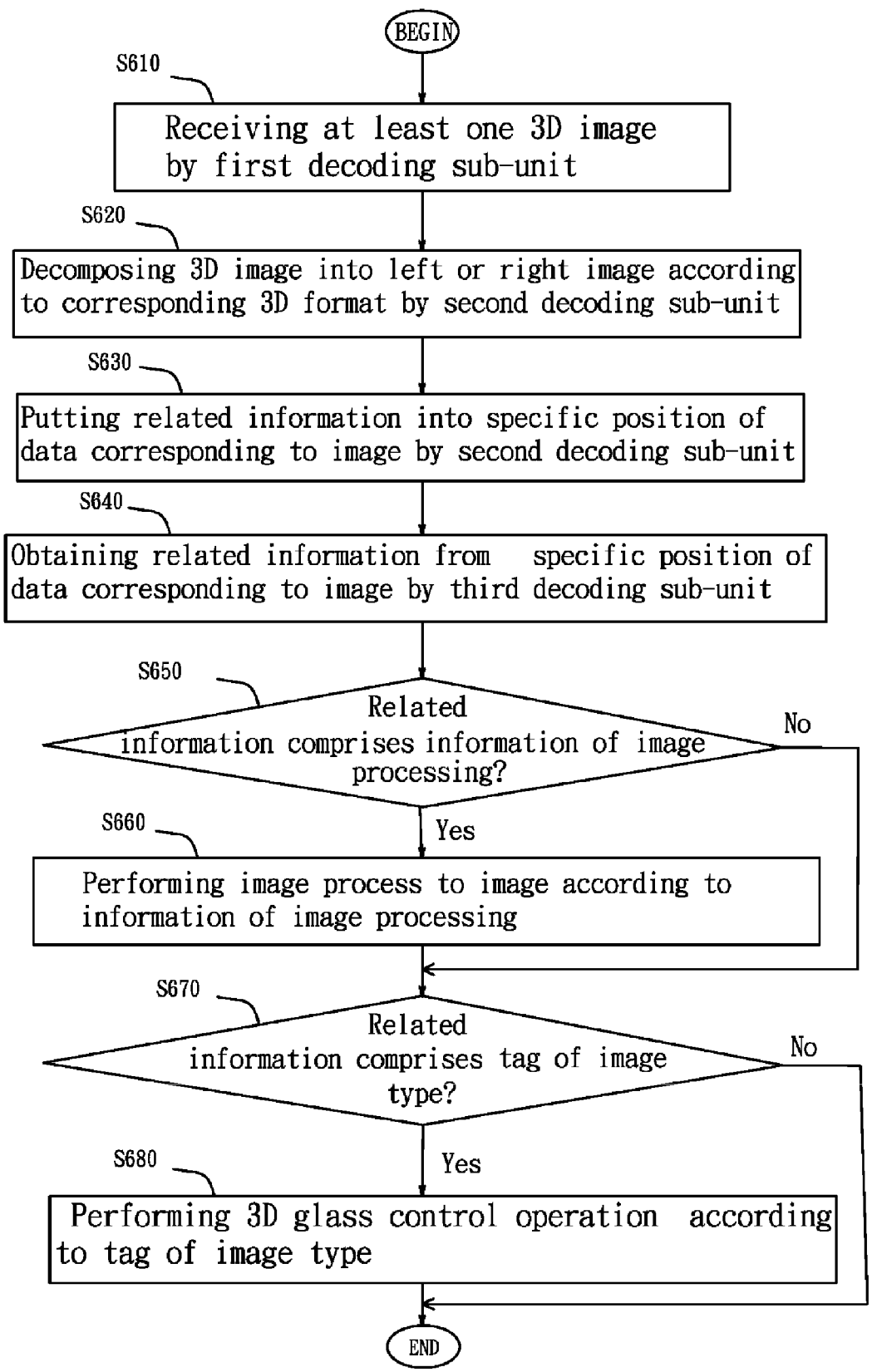
FIG. 6 is a flowchart of another embodiment of a 3D image processing method of the invention.

FIG. 6 is a flowchart of another embodiment of a 3D image processing method of the invention. The 3D image processing method can be used in an electronic device, such as TVs, projectors, game devices, displayers, and any processor-based device having image processing capability. In this embodiment, a 3D image can be first decomposed into left/right images, related information can be added to a specific position in data of the left/right images, and then related control operations can be performed according to the left/right images.

In step S610, a first decoding sub-unit in the image decoding unit receives at least one 3D image. It is noted that, in some embodiments, the first decoding sub-unit in step S610 may be the first decoding sub-unit in the sequence of decoding sub-units in the image decoding unit. Then, in step S620, a second decoding sub-unit in the image decoding unit decomposes the 3D image into a left image or a right image according to a 3D format corresponding to the 3D image. It is understood that, in some embodiments, the first decoding sub-unit and the second decoding sub-unit may be the same decoding sub-unit. In step S630, the second decoding sub-unit added related information into a specific position of data corresponding to the image. It is noted that, the above related information may be various according to different requirements and applications. In some embodiment, the related information can comprise a tag of image type, such as a tag of left image and a tag of right image, representing the image is a left image or a right image, respectively. In some embodiments, the related information can comprise information of image processing, which can be provided to subsequent decoding sub-units for accordingly performing related image processes. Additionally, in some embodiments, the above specific position may be a front porch or a back porch of signal corresponding to the image. It is understood that, in the embodiment, the second decoding sub-unit is used to put related information to the data corresponding to the left image or the right image. However, in some embodiments, the action of putting related information to the data corresponding to the image can be performed by other subsequent decoding sub-units.

Then, in step S640, a third decoding sub-unit in the image decoding unit obtains the related information corresponding to the image from the specific position of the data corresponding to the left image or the right image. It is understood that, in some embodiments, in the sequence of decoding sub-units in the image decoding unit, the third decoding sub-unit may be immediately or indirectly in the rear of the second decoding sub-unit. In step S650, it is determined whether the related information obtained from the specific position comprises information of image processing. If the related information does not comprise information of image processing (No in step S650), the procedure goes to step S670. If the related information comprises information of image processing (Yes in step S650), in step S660, the third decoding sub-unit performs an image process to the image according to the information of image processing. It is understood that, in some embodiments, the image process can comprise display of user operational interface, color process, dynamic image process, and/or keystone correction. Then, in step S670, it is determined whether the related information obtained from the specific position comprises a tag of image type. If the related information does not comprise a tag of image type (No in step S670), the procedure is completed. If the related information comprises a tag of image type (Yes in step S670), in step S680, a 3D glass control operation is performed according to the tag of image type (tag of left image or tag of right image). It is noted that, in the 3D glass control operation, a left eye grating of the 3D glass is opened and a right eye grating of the 3D glass is closed when the tag of image type is a tag of left image. Similarly, a left eye grating of the 3D glass is closed and a right eye grating of the 3D glass is opened when the tag of image type is a tag of right image. It is noted that, in the embodiment, the third decoding sub-unit is used to perform the image process and the 3D glass control operation. However, in some embodiments, the image process and the 3D glass control operation can be performed by different decoding sub-units.

Figure 7:
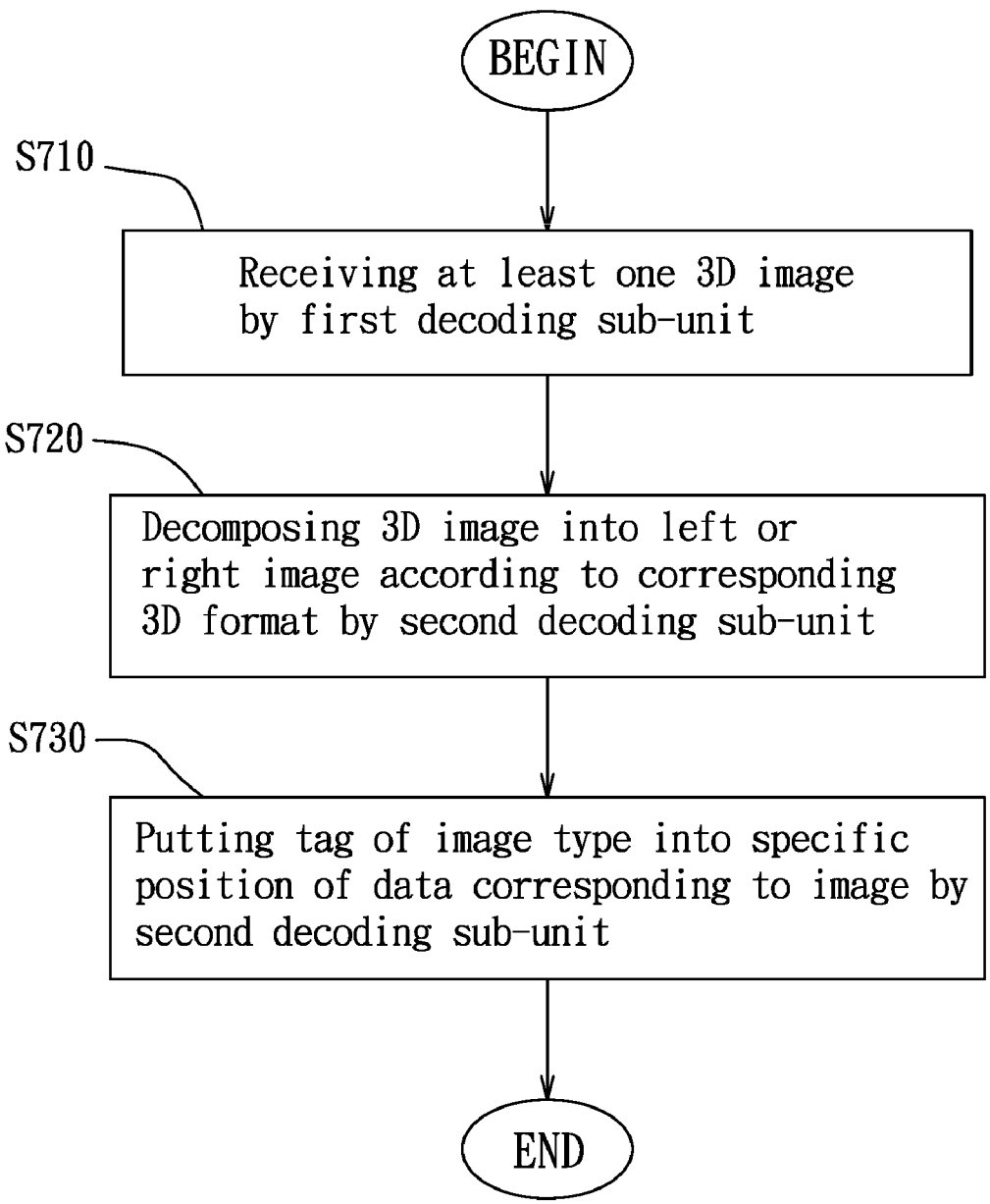
FIG. 7 is a flowchart of another embodiment of a 3D image processing method of the invention.

FIG. 7 is a flowchart of another embodiment of a 3D image processing method of the invention. The 3D image processing method can be used in an electronic device, such as TVs, projectors, game devices, displayers, and any processor-based device having image processing capability. In this embodiment, a 3D image can be first decomposed into left/right images, and a tag of image type corresponding to the image can be added to a specific position in data of the left/right images.

In step S710, a first decoding sub-unit in the image decoding unit receives at least one 3D image. It is noted that, in some embodiments, the first decoding sub-unit in step S710 may be the first decoding sub-unit in the sequence of decoding sub-units in the image decoding unit. Then, in step S720, a second decoding sub-unit in the image decoding unit decomposes the 3D image into a left image or a right image according to a 3D format corresponding to the 3D image. It is understood that, in some embodiments, the first decoding sub-unit and the second decoding sub-unit may be the same decoding sub-unit. In step S730, the second decoding sub-unit added a tag of image type, such as a tag of left image and a tag of right image into a specific position of data corresponding to the image. It is noted that, in some embodiments, the above specific position may be a front porch or a back porch of signal corresponding to the image. It is understood that, the data at the specific position can be provided to subsequent levels of the decoding sub-units for accordingly performing related controls and applications.

It is noted that, in addition to the tag of image type, other related information, such as information of image processing can be also added to the specific position of the data corresponding to the image, which can be provided to subsequent decoding sub-units for accordingly performing related processes to the image.

Therefore, the 3D image processing methods and systems can first decompose a 3D image into left/right images, and then perform related control operations, thus to avoid distortions and mistakes due to image processing. Additionally, related information, such as a tag of image type and information of image processing can be added to a specific position in data of the left/right images, and subsequent decoding sub-units can directly read the related information at the specific position and accordingly perform related control operations, thus to improve the efficiency of related control operations.

3D image processing methods and systems, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. When implemented on a general-purpose processor, the program code combines with the processor to provide a unique apparatus that operates analogously to the application of specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A 3D image processing method for use in an electronic device having an image decoding unit with a sequence of decoding sub-units, wherein the method comprising:
receiving at least one 3D image by a first decoding sub-unit;
decomposing the 3D image into a left image or a right image according to a 3D format corresponding to the 3D image by a second decoding sub-unit; and
performing a control operation according to the left image or the right image by a third decoding sub-unit, wherein the third decoding sub-unit is in the rear of the second decoding sub-unit in the sequence;
wherein the second decoding sub-unit further puts a tag of image type into a specific position of data corresponding to the left image or the right image, in which the tag of image type comprises a tag of left image and a tag of right image.

2. The method of claim 1, wherein the third decoding sub-unit is immediately or indirectly in the rear of the second decoding sub-unit in the sequence.

3. The method of claim 1, wherein the first decoding sub-unit and the second decoding sub-unit are the same decoding sub-unit.

4. The method of claim 1, further comprising:
obtaining the tag of image type from the specific position of the data corresponding to the left image or the right image by the third decoding sub-unit; and
performing the control operation according to the tag of image type by the third decoding sub-unit, wherein the control operation comprises a 3D glass control operation.

5. The method of claim 1, wherein the specific position is a front porch or a back porch of signal corresponding to the left image or the right image.

6. A 3D image processing method for use in an electronic device having an image decoding unit with a sequence of decoding sub-units, wherein the method comprising:
receiving at least one 3D image by a first decoding sub-unit;
decomposing the 3D image into a left image or a right image according to a 3D format corresponding to the 3D image by a second decoding sub-unit;

performing a control operation according to the left image or the right image by a third decoding sub-unit, wherein the third decoding sub-unit is in the rear of the second decoding sub-unit in the sequence;

putting information of image processing into a specific position of data corresponding to the left image or the right image by the second decoding sub-unit;

obtaining the information of image processing from the specific position of the data corresponding to the left image or the right image by the third decoding sub-unit; and performing the control operation according to the information of image processing by the third decoding sub-unit, wherein the control operation comprises a performance of an image process to the left image or the right image according to the information of image processing.

7. A 3D image processing method for use in an electronic device having an image decoding unit, wherein the method comprising, comprising:
receiving at least one 3D image;
decomposing the 3D image into a left image or a right image according to a 3D format corresponding to the 3D image; and
putting a tag of image type into a specific position of data corresponding to the left image or the right image, wherein the tag of image type comprises a tag of left image and a tag of right image.

8. The method of claim 7, further comprising putting information of image processing into the specific position of the data corresponding to the left image or the right image.

9. The method of claim 7, wherein the specific position is a front porch or a back porch of signal corresponding to the left image or the right image.

10. A 3D image processing system for use in an electronic device, comprising:
an image decoding unit comprising a sequence of decoding sub-units, wherein the image decoding unit comprises:
a first decoding sub-unit receiving at least one 3D image;
a second decoding sub-unit decomposing the 3D image into a left image or a right image according to a 3D format corresponding to the 3D image; and
a third decoding sub-unit performing a control operation according to the left image or the right image, wherein the third decoding sub-unit is in the rear of the second decoding sub-unit in the sequence;
wherein the second decoding sub-unit further puts a tag of image type into a specific position of data corresponding to the left image or the right image, in which the tag of image type comprises a tag of left image and a tag of right image.

11. The system of claim 10, wherein the third decoding sub-unit is immediately or indirectly in the rear of the second decoding sub-unit in the sequence.

12. The system of claim 10, wherein the first decoding sub-unit and the second decoding sub-unit are the same decoding sub-unit.

13. The system of claim 10, wherein the third decoding sub-unit further obtains the tag of image type from the specific position of the data corresponding to the left image or the right image, and performs the control operation according to the tag of image type, wherein the control operation comprises a 3D glass control operation.

14. The system of claim 10, wherein the specific position is a front porch or a back porch of signal corresponding to the left image or the right image.

15. A 3D image processing system for use in an electronic device, comprising:
an image decoding unit comprising a sequence of decoding sub-units, wherein the image decoding unit comprises:
a first decoding sub-unit receiving at least one 3D image;
a second decoding sub-unit decomposing the 3D image into a left image or a right image according to a 3D format corresponding to the 3D image; and
a third decoding sub-unit performing a control operation according to the left image or the right image, wherein the third decoding sub-unit is in the rear of the second decoding sub-unit in the sequence;
wherein the second decoding sub-unit further puts information of image processing into a specific position of data corresponding to the left image or the right image, and the third decoding sub-unit obtains the information of image processing from the specific position of the data corresponding to the left image or the right image, and performs the control operation according to the information of image processing, wherein the control operation comprises a performance of an image process to the left image or the right image according to the information of image processing.

16. A 3D image processing system for use in an electronic device, comprising at least:
an image decoding unit receiving at least one 3D image, decomposing the 3D image into a left image or a right image according to a 3D format corresponding to the 3D image, and putting a tag of image type into a specific position of data corresponding to the left image or the right image, wherein the tag of image type comprises a tag of left image and a tag of right image.

17. The system of claim 16, wherein the image decoding unit further puts information of image processing into the specific position of the data corresponding to the left image or the right image.

18. The system of claim 16, wherein the specific position is a front porch or a back porch of signal corresponding to the left image or the right image.

* * * * *